United States Patent [19]

Moring

[11] 4,188,272

[45] Feb. 12, 1980

[54] ELECTRICAL CHEMICAL PROCESS FOR THE REMOVAL OF HEXAVALENT CHROMIUM FROM AQUEOUS MEDIUM

[75] Inventor: James M. Moring, Longview, Tex.

[73] Assignee: Eastman Kodak Company, Rochester, N.Y.

[21] Appl. No.: 36,939

[22] Filed: May 7, 1979

[51] Int. Cl.$^2$ .......................... C02C 5/12; C25C 1/10
[52] U.S. Cl. ..................................... 204/149; 204/97; 204/130; 204/152
[58] Field of Search ................ 204/97, 149, 150, 151, 204/152, 180 P, 130

[56] References Cited

U.S. PATENT DOCUMENTS

| | | | |
|---|---|---|---|
| 3,423,300 | 1/1969 | Joó et al. | 204/97 X |
| 3,481,851 | 12/1969 | Lancy | 204/97 X |
| 3,679,557 | 7/1972 | Gilby et al. | 204/97 |
| 3,682,796 | 8/1972 | Dev-Bedi et al. | 204/97 |
| 3,926,754 | 12/1975 | Lee | 204/152 |
| 4,035,269 | 7/1977 | Mastrorilli | 204/150 |
| 4,118,295 | 10/1978 | Korenowski et al. | 204/151 |
| 4,144,145 | 3/1979 | Watanabe et al. | 204/180 P X |
| 4,144,149 | 3/1979 | Bollhalder et al. | 204/149 |

*Primary Examiner*—Arthur C. Prescott
*Attorney, Agent, or Firm*—Edward R. Weber; Daniel B. Reece, III

[57] ABSTRACT

The invention relates to a method for improving the capacity of an electrochemical production unit used for removal of hexavalent chromium from aqueous medium by controlling the pH of the aqueous medium fed to the electrochemical unit.

4 Claims, No Drawings

ELECTRICAL CHEMICAL PROCESS FOR THE REMOVAL OF HEXAVALENT CHROMIUM FROM AQUEOUS MEDIUM

The invention relates to a method for improving the capacity of an electrochemical production unit used for removal of hexavalent chromium from aqueous medium by controlling the pH of the aqueous medium fed to the electrochemical unit. More particularly the capacity of the electrochemical reduction unit is significantly improved when the pH of the chromate containing feed stream is controlled at about 4.5 to about 5.8.

Among the most difficult purification problems are those relating to removing small quantities of metallic or anionic radical contaminants from dilute aqueous solutions such as rinse water from chrome plating operations and purge streams from cooling tower waters that contain hexavalent chromium usually as the chromate or dichromate.

Prior art methods for the removal of waste from liquid or aqueous medium have included chemical reactions, drying, combustion, ion exchange, sorption and electrolytic processes to convert the waste to acceptable compounds or to concentrate them and make them more readily disposable. Recently a process has been patented (U.S. Pat. No. 3,926,754) whereby contaminating ions are removed from an aqueous medium, e.g., hexavalent chromium ions are removed from cooling tower waters, by an electrochemical method which includes formation of an insoluble iron compound or complex of the contaminant ion utilizing an anode of iron, iron alloy or insoluble iron compound. The hexavalent chromium contaminant, as chromate or dichromate, is changed to trivalent chromium, a less toxic form. The method is applicable to the removal of other contaminating ions, e.g., cyanide. The process of U.S. Pat. No. 3,926,754 is based on the use of sacrificial iron electrodes to reduce the soluble hexavalent chromium ($Cr^{+6}$) to the insoluble trivalent chromium ($Cr^{+3}$). Direct electrical current (10 to 30 amps) is applied across the iron anodes and cathodes to produce ferrous hydroxide which reduces the chromium and precipitates it as chromic hydroxide. The reactions involved in this electrochemical process are believed to be as follows.

| | |
|---|---|
| Anode: | $Fe°$ (Iron) $= Fe^{+2}$ (Ferrous Ion) $+ 2e^-$ |
| Cathode: | $2 H_2O$ (Water) $+ 2e^- = H_2$ (Hydrogen) $+ 2 OH^-$ (Hydroxyl Ion) |
| Liquid: | $3 Fe^{+2} + CrO_4^{-2}$ (Chromate Ion) $+ 4 H_2O =$ $3 Fe^{+3}$ (Ferric Ion) $+ 3 Cr^{+3}$ (Chromic Ion) $+ 8 OH^-$ |

One of the principal distinguishing features claimed in U.S. Pat. No. 3,926,754 is that the invention works well over a broad range of pH's and no pH control is required. "On the contrary, with the present invention pH adjustment is essentially self controlled and may be in a near neutral range, e.g., 4–11, preferably 6–11". (U.S. Pat. No. 3,926,755, Col. 3, lines 11–14). Similar statements are found at other places in the patent specification and in the claims. It was therefore quite surprising to find that when the process is operated with the pH controlled at a level of from about 4.5 to about 5.9 a significant increase in chromate removal capacity occurs.

The effect of the cooling tower blowdown feed stream pH on the chromium removal capacity of the process can be determined by conducting field tests on a cell in which the pH of the feed stream is varied and changes in chromium removal observed. The tests use the following procedure:

1. Feed rate to the cell is set at 150 gallons per minute and held at this rate during each test.
2. Amperage level is lowered until the cell effluent chromium$^{+6}$ concentration increases from less than 0.005 ppm to 0.1 to 0.3 ppm. The amperage level is then maintained at a value which yields 0.1 to 0.3 ppm of $Cr^{+6}$. The effluent chromium$^{+6}$ concentration is increased so that improvements in efficiency can be detected as well as any adverse effects.
3. The pH of the feed stream is varied by injecting 20 percent caustic or 13 percent sulfuric acid into the feed pipline. Inlet and outlet chromium$^{+6}$ concentrations are obtained to determine chromium removal effects.
4. Cell performance is checked after each test to confirm that conditions before and after the test remain constant.

The test results (see Table I) reveal that the cell effluent $Cr^{+6}$ concentration increases from 0.15 ppm to 0.61 ppm when the feed pH is raised from 6.9 to 9.6. As shown in Table I when the cell operating conditions are returned to normal the chromium removal efficiency of the cell does not return to the previous level. Other tests confirm the adverse effect of high feed pH on chromium removal and the apparent long term effect on the cell even after the feed pH returns to normal. Efforts to restore cell efficiency, following a pH increase to about 9.0 by reversing polarity to the cell and by acid washing of the anode and cathode are unsuccessful. Cell efficiency may be returned to the original level by increasing the amperage level about 12 percent. This amperage increase represents a decrease in cell capacity of about 15 percent.

When the pH of the cell feed is lowered from 7.4 to 5.4 by injecting dilute sulfuric acid, the test results show the cell outlet $Cr^{+6}$ concentration decreases from 0.25 ppm to less than 0.005 ppm. See Table I for conditions and results. A reduction in cell amperage (higher capacity) of 18 percent is achieved before the cell outlet $Cr^{+6}$ concentration increases to the concentration obtained at feed pH of 7.4.

Additional tests are conducted on the cell to determine the effect lower pH feed material has upon the capacity of the cell. These tests consist of determining the capacity of the cell compared to design criteria (feed pH of 6.9) and then determining the capacity at pH levels of 5.9 and 4.8 feed pH. The results of these capacity tests (see Table II) indicate the capacity of the cell is 14 percent higher at a feed pH of 5.9 and 28 percent higher at a feed pH of 4.8.

Table I

| | | | | | | | | | | |
|---|---|---|---|---|---|---|---|---|---|---|
| | | | | | Chromate Removal - Effect of Feed pH | | | | | |
| | Cell Feed | | | Cell Outlet | | | Operating Conditions | | | |
| Flow, gpm | $Cr^{+6}$, ppm | Cond. | pH | $Cr^{+6}$, ppm | Cond. | pH | Voltage | Amperage | % Excess Amp | Comments |
| 150 | 7.8 | 2,000 | 6.9 | 0.15 | 1,900 | 7.6 | 105 | 21.5 | 31.2 | Operation before pH increase |

Table I-continued

Chromate Removal - Effect of Feed pH

| Cell Feed | | | | Cell Outlet | | | Operating Conditions | | | |
|---|---|---|---|---|---|---|---|---|---|---|
| Flow, gpm | $Cr^{+6}$, ppm | Cond. | pH | $Cr^{+6}$, ppm | Cond. | pH | Voltage | Amperage | % Excess Amp | Comments |
| 150 | 7.8 | 1,900 | 9.6 | 0.61 | 1,900 | 9.6 | 105 | 21.5 | — | High pH feed |
| 150 | 7.1 | — | 7.3 | 0.51 | 2,100 | 8.4 | 105 | 21.5 | 44.1[3] | Operation after pH increase[2] |
| 150 | 7.1 | — | 7.3 | 0.18 | — | 8.2 | 110 | 24.0[1] | 60.9 | Amperage required to achieve Same $Cr^{+6}$ outlet conc. as before pH increase. |
| 150 | 7.2 | 2,000 | 7.4 | 0.25 | 2,000 | 8.1 | 105 | 22.0 | 45.4 | Operation before pH decrease |
| 150 | 7.2 | 2,100 | 5.4 | <0.005 | 2,000 | 7.4 | 105 | 22.0 | — | Low pH feed |
| 150 | 6.5 | — | 7.0 | 0.22 | 2,000 | 7.9 | 105 | 22.0 | 61.1 | Operation after pH decrease |
| 150 | 6.5 | — | 5.2 | 0.135 | — | 6.3 | 95 | 18.0[4] | 31.9[5] | Amps at low pH to produce $Cr^{+6}$ conc. in cell effluent the same as before pH decrease |

Notes:
[1] Twelve percent increase in amperage required to return to base conditions after pH increase to 9.6.
[2] After pH increase, reversing cell polarity or acid washing does not restore cell performance.
[3] Capacity reduced as much as 15 percent by high pH.
[4] Amperage reduced 18 percent at low pH compared to normal pH feed.
[5] Capacity increased 15-20 percent by reducing feed pH to 5.0-5.5.

Table II

Chromate Removal - Low pH Feed Capacity Test Results

| Cell Feed | | | Cell Outlet | | Operating Conditions | | | Capacity As[2] % of Design | Capacity Increase, %, Compared to Unadjusted pH Capacity | Comments |
|---|---|---|---|---|---|---|---|---|---|---|
| Flow, gpm | $Cr^{+6}$ ppm | pH | $Cr^{+6}$, ppm | pH | Voltage | Amperage | % Excess[1] Amperage | | | |
| 150 | 7.1 | 6.9 | 0.061 | 8.0 | 125 | 24 | 61 | 68.3 | — | Min. amperage for $Cr^{+6}$ removal. Capacity at these conditions. |
| 150 | 7.1 | 6.9 | 0.194 | 8.4 | 120 | 23 | 54 | — | — | Amperage too low, cell capacity exceeded. |
| 150 | 6.8 | 4.8 | <.005 | 6.8 | 120 | 23 | 61 | — | — | Feed pH decrease. |
| 150 | 6.8 | 4.8 | <.005 | 6.7 | 110 | 21 | 47 | — | — | Amperage lowered 2.00 amps. |
| 150 | 6.8 | 4.8 | 0.038 | 6.6 | 107 | 19 | 33 | — | — | Amperage lowered 2.0 amps. |
| 150 | 6.8 | 4.8 | 0.068 | 6.4 | 102 | 18 | 26 | 87.3 | 28 | Min. amperage for $Cr^{+6}$ removal, capacity at pH of 4.8. |
| 150 | 6.8 | 4.8 | 0.332 | 6.3 | 100 | 17 | 19 | — | — | Amperage too low, capacity exceeded at 4.8 pH feed. |
| 150 | 7.1 | 5.8 | 0.35 | 8.2 | 102 | 18 | 21 | — | — | Feed pH 1.0 unit below normal. |
| 150 | 7.1 | 5.8 | 0.32 | 8.0 | 107 | 20 | 34 | — | — | |
| 150 | 7.1 | 5.8 | 0.02 | 7.9 | 110 | 21 | 41 | 78.1 | 14 | Min. amperage for $Cr^{+6}$ removal, capacity at pH of 5.8. |
| 150 | 7.1 | 7.1 | 0.081 | 8.2 | 120 | 24 | 61 | 68.3 | — | Capacity determined after above test. No change in performance. |

Notes:
[1] Excess amps expressed as percentage required above theoretical amps. Theoretical amps defined as follows:

$$\text{Theo. amps} = \frac{(\text{Flow, gpm})(Cr^{+6}, \text{ppm})}{71.4}$$

[2] Design capacity is based on 10 percent excess amperage above theoretical. Capacity expressed as percentage of design is $$\frac{[\text{design excess amps}]}{[\text{actual excess amps}]} \cdot 100 \quad \text{Example:} \left(\frac{1.10}{1.61}\right)(100) = 68.3\%$$

The invention has been described in detail with particular reference to preferred embodiments thereof. But it will be understood that variations and modifications can be effected within the spirit and scope of the specification and the appended claims.

We claim:

1. In a method for electrochemically removing from an ionizing medium a contaminant ion which is capable of forming an insoluble iron compound or complex, which comprises passing an electric current through the ionizing medium containing the ion to be removed between an anode which has a surface or a portion of a surface thereof of iron, iron alloy or insoluble iron compound, and a cathode so as to produce anodically an insoluble iron compound, species or complex in said ionizing medium while cathodically reacting said contaminant ion with the ionizing medium to generate an insoluble hydroxide thereof and whereby an insoluble iron compound or complex with the contaminant ion is produced, and removing said insoluble iron compound or complex with the contaminant ion from the ionizing medium, the improvement wherein the pH of the feed stream is controlled at a level of from about 4.5 to about 5.8.

2. A process according to claim 1 wherein the pH is controlled at a level of from about 4.8 to about 5.2.

3. In a method for electrochemically removing hexavalent chromium from an aqueous medium which comprises passing an electric current through the aqueous medium containing the hexavalent chromium between an anode which has a surface or a portion of a surface thereof of iron, iron alloy or insoluble iron compound, and a cathode so as to produce anodically an insoluble iron compound, species or complex in said aqueous medium while cathodically reacting said hexavalent chromium to generate an insoluble hydroxide thereof and whereby an insoluble iron compound or complex with the hexavalent chromium is produced, and removing said insoluble iron compound or complex with the hexavalent chromium from the aqueous medium, the improvement wherein the pH of the aqueous feed stream is controlled at a level of from about 4.5 to about 5.8.

4. A process according to claim 3 wherein the pH is controlled at a level of from about 4.8 to about 5.2.

* * * * *